United States Patent [19]

Nishino et al.

[11] Patent Number: 4,532,115

[45] Date of Patent: Jul. 30, 1985

[54] METHOD FOR REMOVAL OF POISONOUS GASES

[75] Inventors: Hiroshi Nishino, Suita; Toshio Aibe, Kashima, both of Japan

[73] Assignee: Takeda Chemical Industries, Ltd., Osaka, Japan

[21] Appl. No.: 581,367

[22] Filed: Feb. 17, 1984

[30] Foreign Application Priority Data

Mar. 3, 1983 [JP] Japan .................................. 58-34923
Sep. 26, 1983 [JP] Japan ................................ 58-178412

[51] Int. Cl.³ .............................................. B01D 53/34
[52] U.S. Cl. ..................................... 423/210; 502/417
[58] Field of Search ........... 423/210 R, 210 S, 210 M, 423/294, 299, 509, 645; 502/417

[56] References Cited

U.S. PATENT DOCUMENTS 1,519,470 12/1924 Wilson et al. .................... 423/210 S
4,048,387 9/1977 Lahme et al. .......................... 429/50

FOREIGN PATENT DOCUMENTS 89837 7/1981 Japan .
328593 4/1930 United Kingdom ............ 423/210 S
2114911 9/1983 United Kingdom .

OTHER PUBLICATIONS

Lamb et al., "Gas Mask Absorbents" Journal of Industrial & Engineering Chemistry, vol. II, No. 5, 1919 pp. 420–438.

*Primary Examiner*—Earl C. Thomas
*Attorney, Agent, or Firm*—Wenderoth, Lind & Ponack

[57] ABSTRACT

Hydrides of As, B, P, Sb or Se in a gas can easily be removed from the gas by contacting the gas with an adsorbent consisting of activated carbon containing:
(1) copper oxide and
(2) at least one of (a), (b) and (c) selected from the group consisting of
  (a) at least one alkali metal compound, and
  (b) at least one alkaline earth metal compound and
  (c) at least one compound of Al, Ti, V, Cr, Mn, Fe, Co, Ni, Zn, Cd and Pb.

8 Claims, No Drawings

METHOD FOR REMOVAL OF POISONOUS GASES

The present invention relates to a method of treating poisonous gases containing hydrides of As, B, P, Sb or Se.

Although hydrides such as $AsH_3$, $B_2H_6$, $PH_3$, $SbH_3$ and $H_2Se$ have been used in large quantities as raw material gas for the production of semiconductors, fumigation gas, etc., such hydrides, even in trace amounts, are extremely noxious to the human body, and efficient removal of these hydrides from gases is strongly demanded.

As the method of removing hydrides of As, B, P, Sb and Se in gases, there have been proposed processes of washing with chemical solutions such as oxidizing solutions or methods of adsorption by use of activated carbon, etc. and the like. Nevertheless, such processes and methods exhibit poor removal effect, and efficient adsorbents have long been wanted.

The present inventors, in view of such circumstances, conducted intensive investigation, and as a result, found that arsines in fluids can be removed very efficiently by using an activated carbon containing copper oxides and alkali metal compounds, alkaline earth metal compounds or metal compounds of Al, Ti, V, Cr, Mn, Fe, Co, Ni, Zn, Cd nd Pb, which has culminated in the present invention.

Thus, the present invention relates to a method for the removal of at least one hydride of As, B, P, Sb and Se from a gas containing the same, which comprises contacting the gas with an activated carbon containing:

(1) copper oxide (hereinafter referred to in some instances as "First Component") and (2) at least one of (a), (b) and (c) (hereinafter referred to in some instances as "Second Component") selected from the group consisting of (a) at least one alkali metal compound, (b) at least one alkaline earth metal compound and (c) at least one compound of Al, Ti, V, Cr, Mn, Fe, Co, Ni, Zn, Cd and Pb.

In the present method, an activated carbon containing First and Second Components is used as adsorbent. The adsorbent can be prepared by allowing activated carbon to contain First and Second Components.

The activated carbon may be any type of activated carbon, if it is produced by the known processes with coal, coke, charcoal, coconut shells, resins, etc. employed as raw material and shows a specific surface area of 200 to 2000 $m^2/g$; with reference to its shape or form, use is made of proper-shaped activated carbon, such as spherical- or cylindrical-shaped, crushed, powdered and fiber-like, depending upon the treatment method of gases.

The copper oxide which is employable as the First Component in the present invention may be either cuprous or cupric oxide.

Examples of the alkali metal compound, which is one of the Second Components, include inorganic acid salts or inorganic compounds of Li, Na, K, Rb and Cs, such as hydrogencarbonates, carbonates, nitrates, borates, silicates, sulfates, halides and hydroxides, and organic acid salts thereof, such as formates, acetates, oxalates, benzoates, salts of phenols and salts of sulfonic acids.

Examples of the alkaline earth metal compound, which is another Second Component, include inorganic acid salts or inorganic compounds of Be, Mg, Ca, Sr and Ba, such as carbonates, nitrates, sulfates, phosphates, halides, oxides and hydroxides, and organic acid salts thereof, such as formates, acetates and oxalates.

Examples of the compounds of Al, Ti, V, Cr, Mn, Fe, Co, Ni, Zn, Cd and Pb, which are still other Second Components, include inorganic acid salts or inorganic compounds of these metals, such as carbonates, hydrogencarbonates, nitrates, borates, silicates, sulfates, phosphates, halides, hydroxides, ammonium salts and oxides, and organic acid salts, such as formates, acetates, oxalates, benzoates, salts of phenols and salts of sulfonic acids.

Though the adsorbents used in the present invention consist of an activated carbon containing the First and Second Components, the Second Component may be composed of an alkali metal compound [hereinafter referred to in some instances as "Component (a)"] solely, an alkaline earth metal compound [hereinafter referred to in some instances as "Component (b)"] alone or compounds of Al, Cr, Ti, V, Mn, Fe, Co, Ni, Zn, Cd and Pb [hereinafter referred to in some instances as "Component (c)"] solely, or also may comprise two kinds of these components, such as the Components (a) and (b), Components (b) and (c) and Components (c) and (a), or may consist of three kinds of the components, the Components (a), (b) and (c). In addition, the adsorbents may contain at least two compounds as the First Component, and may contain two or more components within the same Component group as the Second Components, for example two different components within the group of the Component (a).

The content of the First Component in the activated carbon containing metal compounds is 0.1 mg-atom to 3.0 mg-atom as metal per g of activated carbon, preferably 0.2 mg-atom to 2.0 mg-atom, while the content of the Second Component is 0.1 mg-atom to 5.0 mg-atom as metal per g of activated carbon, preferably 0.2 mg-atom to 4.0 mg-atom.

Each of the components contained in the activated carbon may be either supported or deposited on activated carbon, and the adsorbent may be made by adding each of the components to a raw material for activated carbon and activating the mixture. Furthermore, the adsorbents may be produced by adding part of the First and Second Components to a raw material for activated carbon and activating the mixture, followed by depositing the remainder of the Components on the resulting activated product. In cases in which the Components (b) and (c) to be deposited as the Second Component on activated carbon are other than oxides and the Component (a) is other than hydroxides, carbonates and hydrogencarbonates, it is desirable to conduct drying or calcining after the deposition.

With reference to the method of depositing each of the components on activated carbon, a procedure of impregnating or spraying activated carbon with a solution or suspension of each of the components in water (inclusive of aqueous acid or alkali solutions) or a variety of solvents may be used. In the above preparation process, meanwhile, the term "drying" denotes a step of evaporating the water or solvent in activated carbon deposited with the metal compounds at a temperature of not more than about 130° C., while the expression "calcining" means a step of heating the dried activated carbon deposited with the metal compounds in an atmosphere of inert gas, carbon dioxide gas, steam, combustion waste gas, etc. at a temperature of not less than 130°

C. to thermally decompose the metal compounds partially or wholly.

Also, the activated carbon supported with copper oxide can be obtained by depositing on activated carbon inorganic acid salts or inorganic compounds of copper such as carbonates, basic carbonates, nitrates, sulphates, phosphates, halides, and hydroxides and organic acid salt thereof such as formates, acetates and oxalates in place of the First Component, and then calcining the mixture at a temperature of not less than 130° C. to convert only part of or all of these salts into copper oxide. The adsorbents of the present invention containing the First and Second Components can be produced by performing the deposition of the Second Components, before, after or simultaneously with, the calcining.

The method of the present invention is conducted by contacting a gas containing hydrides of As, B, P, Sb and Se with the activated carbon containing the metal compounds as obtained by the above procedure. The objective substances, which are to be removed by the present method, are hydrides of As, B, P, Sb and Se, such as $AsH_3$, $B_2H_6$, $PH_3$, $SbH_3$ and $H_2Se$.

As the procedure of contacting, use is made of the known means, such as the fixed bed, moving bed and fluidized bed. In such cases, the contacting temperature is not more than 200° C., preferably 0° to 150° C., while the pressure is not more than 50 kg/cm$^2$, preferably 0.1 to 40 kg/cm$^2$. The contacting time is 1/10 to 100 seconds as converted at 25° C. and 1 kg/cm$^2$, preferably 1/5 to 80 seconds.

The contact of the poisonous gas with the activated carbon in the present method can be conducted in the absence or presence of oxygen. Thus the method of the present invention can be applied to the treatment of not only a poisonous gas containing oxygen but also a posisonous gas not containing oxygen. Though hydrides of As, B, P, Sb or Se can be removed to a certain extent from a poisonous gas containing oxygen by a known method in which activated carbon not containing any metal compound is used, the hydrides are hardly removable from a poisonous gas not containing oxygen by the known method. Therefore, the method of the present invention is advantageously applied to the treatment of a poisonous gas not containing oxygen.

The examples described below illustrate the present invention more specifically.

EXAMPLE 1

Activated carbon $A_0$ of 16 to 24 mesh having the BET specific surface area of 1,150 m$^2$/g was sprayed uniformly with aqueous solutions containing a given amount each of the First Component (copper nitrate) and the Second Component (nitrate of an alkali metal, nitrate of an alkaline earth metal and nitrate of Al, Ti, V, Cr, Mn, Fe, Co, Ni, Zn, Cd or Pb (or sulphate for V alone).

50 ml of the resultant activated carbon deposited with the metal compounds was packed into a 4 cm$\phi$ column made of quartz glass, which was then heated at a heating rate of 5° C./min while passing nitrogen gas at a linear flow rate of 10 cm/sec, followed by calcining at 300° C. for 30 minutes.

The content of each of the metal compounds in the resultant adsorbent was 0.2 to 2.0 mg-atom as respective metals per g of activated carbon, as shown in Table 1.

By following the same procedure as described above, as control reference, activated carbon $A_0$ was deposited with nitrate of each metal alone, and calcined in a nitrogen gas at 300° C. for 30 minutes to prepare adsorbents.

15 ml each of the adsorbents as obtained in this manner was packed into a 6 cm$\phi$ column made of glass, respectively, and a gas($N_2$-97.5 vol. % and $H_2O$-2.5 vol.%) of 30° C. containing 12 ppm of $PH_3$ was passed through the columns at a linear flow rate of 40 cm/sec to conduct the breakthrough adsorption tests for $PH_3$. The removal percentages for $PH_3$ at different times were measured, and the results are shown in Table 1.

EXAMPLE 2

Packed into a 1.6 cm$\phi$ column made of glass was 20 ml each of the adsorbents of Example 1, $A_0$ $A_1$, $A_3$, $A_9$, $B_2$, $B_3$, $C_4$, $C_6$, $C_9$, $D_2$, $D_3$, $D_8$, $D_{10}$, $D_{12}$, $D_{13}$, $D_{14}$ and $D_{15}$, and a gas ($N_2$-97.5 vol. % and $H_2O$-2.5 vol.%) of 30° C. containing 10 ppm of $B_2H_6$, 10 ppm of $H_2Se$ or 10 ppm of $SbH_3$ was passed through the columns at a linear flow rate of 30 cm/sec to conduct the breakthrough adsorption test for $B_2H_6$ and $H_2Se$ or $SbH_3$ with each of the adsorbents alone. The length of time required until $B_2H_6$ and $H_2Se$ or $SbH_3$ leaked out of the column (the length of time for which breakthrough ratio of respective hydride compounds reached 5%) was measured, and the results are shown in Table 2.

EXAMPLE 3

Activated carbon A of 16 to 24 mesh having the BET specific surface area of 1040 m$^2$/g was sprayed uniformly with aqueous solutions containing a given amount each of the First Component (copper nitrate) and the Second Component (nitrate of an alkali metal, nitrate of an alkaline earth metal and nitrate of Al, Ti, V, Cr, Mn, Fe, Co, Ni, Zn, Cd or Pb (or sulphate for V alone).

50 ml of the resultant activated carbon deposited with the metal compounds was packed into a 4 cm$\phi$ column made of quartz glass, which was heated at a heating rate of 5° C./min while passing a nitrogen gas at a linear flow rate of 10 cm/sec, followed by calcining at 300° C. for 30 minutes.

The content of each of the metal compounds in the resultant adsorbents was 0.2 to 2.0 mg-atom as respective metals per g of activated carbon, as shown in Table 3.

By following the same procedure as described above, as control reference, activated carbon A was deposited with nitrate of each metal alone, and calcined in a nitrogen gas at 300° C. for 30 minutes to prepare adsorbents.

20 ml each of the adsorbents as obtained in this manner, A through L and ① through ㊵, were packed into a 1.6 cm$\phi$ column made of glass, and a gas ($N_2$-97.5 vol.% and $H_2O$-2.5 vol.%) of 30° C. containing 30 ppm of $AsH_3$ was passed through the columns at a linear flow rate of 20 cm/sec to conduct the breakthrough adsorption tests for $AsH_3$. The length of time required until $AsH_3$ leaked out of the column (the length of time for which the breakthrough ratio reached 5%) was measured, and the results are shown in Table 3.

TABLE 1

| Adsorbent No. | Amount of Copper (mg-atom/g) | The second component; and its amount (mg-atom/g) | Percent removal of $pH_3$ at the elapsed time shown below (%) | | |
|---|---|---|---|---|---|
| | | | 5 hrs | 10 hrs | 30 hrs |
| $A_0$ (Control) | 0 | 0 | 2 | 0 | 0 |
| $A_1$ (Control) | 2.0 | 0 | 95 | 50 | 15 |
| $A_2$ (Control) | 0 | Na-2.0 | 58 | 31 | 23 |

TABLE 1-continued

| Adsorbent No. | Amount of Copper (mg-atom/g) | The second component; and its amount (mg-atom/g) | Percent removal of pH$_3$ at the elapsed time shown below (%) | | |
|---|---|---|---|---|---|
| | | | 5 hrs | 10 hrs | 30 hrs |
| A$_3$ (Control) | 0 | K-2.0 | 59 | 35 | 20 |
| A$_4$ (Control) | 0 | Mg-2.0 | 48 | 20 | 15 |
| A$_5$ (Control) | 0 | Ca-2.0 | 45 | 34 | 15 |
| A$_6$ (Control) | 0 | Sr-2.0 | 40 | 23 | 10 |
| A$_7$ (Control) | 0 | Al-2.0 | 39 | 33 | 11 |
| A$_8$ (Control) | 0 | Cr-2.0 | 50 | 39 | 25 |
| A$_9$ (Control) | 0 | Fe-2.0 | 45 | 30 | 18 |
| A$_{10}$ (Control) | 0 | Ni-2.0 | 48 | 19 | 11 |
| A$_{11}$ (Control) | 0 | Pb-2.0 | 40 | 21 | 12 |
| B$_1$ (The present invention | 1.0 | Na-1.0 | 100 | 98 | 50 |
| B$_2$ (The present invention) | 1.0 | K-1.0 | 100 | 100 | 68 |
| B$_3$ (The present invention) | 1.0 | Mg-1.0 | 100 | 100 | 75 |
| B$_4$ (The present invention) | 1.0 | Ca-1.0 | 100 | 100 | 63 |
| B$_5$ (The present invention) | 1.0 | Sr-1.0 | 100 | 100 | 54 |
| C$_1$ (The present invention) | 1.0 | Al-1.0 | 100 | 100 | 63 |
| C$_2$ (The present invention) | 1.0 | Ti-1.0 | 100 | 100 | 54 |
| C$_3$ (The present invention) | 1.0 | V-1.0 | 100 | 100 | 50 |
| C$_4$ (The present invention) | 1.0 | Cr-1.0 | 100 | 100 | 73 |
| C$_5$ (The present invention) | 1.0 | Mn-1.0 | 100 | 100 | 41 |
| C$_6$ (The present invention) | 1.0 | Fe-1.0 | 100 | 100 | 29 |
| C$_7$ (The present invention) | 1.0 | Co-1.0 | 100 | 100 | 45 |
| C$_8$ (The present invention) | 1.0 | Ni-1.0 | 100 | 100 | 59 |
| C$_9$ (The present invention) | 1.0 | Zn-1.0 | 100 | 100 | 61 |
| C$_{10}$ (The present invention) | 1.0 | Cd-1.0 | 100 | 95 | 39 |
| C$_{11}$ (The present invention) | 1.0 | Pb-1.0 | 100 | 73 | 54 |
| C$_{12}$ (The present invention) | 0.2 | Cr-1.0 | 100 | 72 | 50 |
| C$_{13}$ (The present invention) | 0.5 | Cr-1.0 | 100 | 95 | 62 |
| C$_{14}$ (The present invention) | 2.0 | Cr-1.0 | 100 | 100 | 80 |
| D$_1$ (The present invention) | 1.0 | Na-0.3, Al-0.5 | 100 | 100 | 95 |
| D$_2$ (The present invention) | 1.0 | K-0.3, V-0.5 | 100 | 100 | 100 |
| D$_3$ (The present invention) | 1.0 | K-0.3, Cr-0.5 | 100 | 100 | 100 |
| D$_4$ (The present invention) | 1.0 | K-0.3, Mn-0.5 | 100 | 100 | 100 |
| D$_5$ (The present invention) | 1.0 | K-0.3, Fe-0.5 | 100 | 100 | 100 |
| D$_6$ (The present invention) | 1.0 | Mg-0.3, Co-0.5 | 100 | 100 | 100 |
| D$_7$ (The present invention) | 1.0 | Ca-0.3, Ni-0.5 | 100 | 100 | 100 |
| D$_8$ The present invention) | 1.0 | K-0.3, Zn-0.5 | 100 | 100 | 100 |
| D$_9$ (The present invention) | 1.0 | Na-0.3, Cd-0.5 | 100 | 100 | 95 |
| D$_{10}$ (The present invention) | 1.0 | K-0.3, Pb-0.5 | 100 | 100 | 88 |
| D$_{11}$ (The present invention) | 0.2 | K-0.3, Cr-0.5 | 100 | 81 | 67 |
| D$_{12}$ (The present invention) | 0.5 | K-0.3, Mn-0.5 | 100 | 99 | 83 |
| D$_{13}$ (The present invention) | 0.2 | Mg-0.5, Cr-0.5 | 100 | 95 | 75 |
| D$_{14}$ (The present invention) | 0.5 | Mg-0.5, Cr-0.5 | 100 | 98 | 80 |
| D$_{15}$ (The present invention) | 1.0 | K-0.3, Mg-0.3 Cr-0.5, Fe-0.25 | 100 | 100 | 100 |

TABLE 2

| Adsorbent No. | The length of time for which the removal percentages for B$_2$H$_6$ reached 95% (hrs) | The length of time for which the removal percentages for H$_2$Se reached 95% (hrs) | The length of time for which the breakthrough ratio of SbH$_3$ reached 5% (hrs) |
|---|---|---|---|
| A$_0$ (Control) | 1/6 | ¼ | ⅓ |
| A$_1$ (Control) | 11 | 15 | 15 |
| A$_3$ (Control) | 6 | 7 | 9 |
| A$_9$ (Control) | 15 | 11 | 11 |
| B$_2$ (The present invention) | 38 | 35 | 30 |
| B$_3$ (The present invention) | 45 | 40 | 41 |
| C$_4$ (The present invention) | 40 | 40 | 39 |
| C$_6$ (The present invention) | 52 | 45 | 41 |
| C$_9$ (The present invention) | 48 | 43 | 47 |
| D$_2$ (The present invention) | 67 | 59 | 63 |
| D$_3$ (The present invention) | 85 | 71 | 90 |
| D$_8$ (The present invention) | 71 | 75 | 62 |
| D$_{10}$ (The present | 60 | 73 | 58 |

TABLE 2-continued

| Adsorbent No. | The length of time for which the removal percentages for $B_2H_6$ reached 95% (hrs) | The length of time for which the removal percentages for $H_2Se$ reached 95% (hrs) | The length of time for which the breakthrough ratio of $SbH_3$ reached 5% (hrs) |
|---|---|---|---|
| $D_{12}$ (The present invention) | 83 | 79 | 65 |
| $D_{13}$ (The present invention) | 68 | 68 | 60 |
| $D_{14}$ (The present invention) | 80 | 78 | 79 |
| $D_{15}$ (The present invention) | 103 | 105 | 110 |

TABLE 3

| Adsorbent No. | Amount of Copper (mg-atom/g) | The second component; and its amount (mg-atom/g) | The length of time for which the breakthrough ratio of $AsH_3$ reached 5% (min.) |
|---|---|---|---|
| A (Control) | 0 | 0 | 15 |
| B (Control) | 2.0 | 0 | 45 |
| C (Control) | 0 | Na-2.0 | 50 |
| D (Control) | 0 | K-2.0 | 65 |
| E (Control) | 0 | Mg-2.0 | 65 |
| F (Control) | 0 | Ca-2.0 | 80 |
| G (Control) | 0 | Sr-2.0 | 85 |
| H (Control) | 0 | Al-2.0 | 40 |
| I (Control) | 0 | Cr-2.0 | 70 |
| J (Control) | 0 | Fe-2.0 | 85 |
| K (Control) | 0 | Ni-2.0 | 75 |
| L (Control) | 0 | Pb-2.0 | 80 |
| ① (The present invention) | 1.0 | Na-1.0 | 610 |
| ② (The present invention) | 1.0 | K-1.0 | 885 |
| ③ (The present invention) | 1.0 | Mg-1.0 | 900 |
| ④ (The present invention) | 1.0 | Ca-1.0 | 880 |
| ⑤ (The present invention) | 1.0 | Sr-1.0 | 870 |
| ⑥ (The present invention) | 1.0 | Al-1.0 | 730 |
| ⑦ (The present invention) | 1.0 | Ti-1.0 | 700 |
| ⑧ (The present invention) | 1.0 | V-1.0 | 960 |
| ⑨ (The present invention) | 1.0 | Cr-1.0 | 950 |
| ⑩ (The present invention) | 1.0 | Mn-1.0 | 880 |
| ⑪ (The present invention) | 1.0 | Fe-1.0 | 790 |
| ⑫ (The present invention) | 1.0 | Co-1.0 | 990 |
| ⑬ (The present invention) | 1.0 | Ni-1.0 | 850 |
| 14 (The present invention) | 1.0 | Zn-1.0 | 750 |
| ⑮ (The present invention) | 1.0 | Cd-1.0 | 700 |
| ⑯ (The present invention) | 1.0 | Pb-1.0 | 730 |
| ⑰ (The present invention) | 0.2 | Cr-1.0 | 450 |
| ⑱ (The present invention) | 0.5 | Cr-1.0 | 600 |
| ⑲ (The present invention) | 2.0 | Cr-1.0 | 1050 |
| ⑳ (The present invention) | 1.0 | Pb-1.0 | 800 |
| ㉑ (The present invention) | 1.0 | Cs-1.0 | 600 |
| ㉒ (The present invention) | 1.0 | Ba-1.0 | 630 |
| ㉓ (The present invention) | 1.0 | Na-0.3, Al-0.5 | 1050 |
| ㉔ (The present invention) | 1.0 | K-0.3, V-0.5 | 1100 |
| ㉕ (The present invention) | 1.0 | K-0.3, Cr-0.5 | 1320 |
| ㉖ (The present invention) | 1.0 | K-0.3, Mn-0.5 | 1260 |
| ㉗ (The present invention) | 1.0 | K-0.3, Fe-0.5 | 1130 |
| ㉘ (The present invention) | 1.0 | Mg-0.3, Co-0.5 | 1290 |
| ㉙ (The present invention) | 1.0 | Ca-0.3, Ni-0.5 | 1350 |
| ㉚ (The present invention) | 1.0 | K-0.3, Zn-0.5 | 1190 |
| ㉛ (The present invention) | 1.0 | Na-0.3, Cd-0.5 | 1200 |
| ㉜ (The present invention) | 1.0 | K-0.3, Pb-0.5 | 1150 |
| ㉝ (The present invention) | 0.2 | K-0.3, Cr-0.5 | 700 |
| ㉞ (The present invention) | 0.5 | K-0.3, Mn-0.5 | 930 |
| ㉟ (The present invention) | 0.2 | Mg-0.5, Cr-0.5 | 850 |
| ㊱ (The present invention) | 0.5 | Mg-0.5, Cr-0.5 | 900 |
| ㊲ (The present invention) | 1.0 | K-0.3, Mg-0.3 | 1300 |
| ㊳ (The present invention) | 1.0 | K-0.3, Co-0.5, Ni-0.5 | 1400 |
| ㊴ (The present invention) | 1.0 | Mg-0.3, Cr-0.5, Mn-0.5 | 1420 |
| ㊵ (The present invention) | 1.0 | K-0.3, Mg-0.3, Cr-0.5, Fe-0.25 | 1510 |

What is claimed is:

1. A method for removal of at least one hydride of As, B, P, Sb and Se from a gas containing said hydride and substantially not containing oxygen, which comprises contacting the gas with an activated carbon containing:
    (1) copper oxide in an amount of 0.1 mg-atom to 3.0 mg-atom as metal per g of activated carbon and
    (2) at least one of (a), (b) and (c) selected from the group consisting of
        (a) at least one alkali metal compound,
        (b) at least one alkaline earth metal compound and
        (c) at least one compound of Al, Ti, V, Cr, Mn, Fe, Co, Ni, Zn, Cd and Pb,
the total amount of (2) being 0.2 mg-atom to 4.0 mg-atom as metal per g of activated carbon.

2. A method as claimed in claim 1, wherein the activated carbon contains:
    (1) copper oxide and
    (2) at least one alkali metal compound.

3. A method as claimed in claim 1, wherein the activated carbon contains:
    (1) copper oxide and
    (2) at least one alkaline earth metal compound.

4. A method as claimed in claim 1, wherein the activated carbon contains:
(1) copper oxide and
(2) at least one compound of Al, Ti, V, Cr, Mn, Fe, Co, Ni, Zn, Cd and Pb.

5. A method as claimed in claim 1, wherein the activated carbon contains:
(1) copper oxide and
(2)
 (a) at least one alkali metal compound and
 (c) at least one compound of Al, Ti, V, Cr, Mn, Fe, Co, Ni, Zn, Cd and Pb.

6. A method as claimed in claim 1, wherein the activated carbon contains:
(1) copper oxide and
(2)
 (a) at least one alkali metal compound,
 (b) at least one alkaline earth metal compound and
 (c) at least one compound of Al, Ti, V, Cr, Mn, Fe, Co, Ni, Zn, Cd and Pb.

7. A method as claimed in claim 1, wherein the activated carbon contains:
(1) copper oxide and
(2)
 (a) a compound of potassium and
 (c) a compound of chromium.

8. A method as claimed in claim 1, wherein the gas is contacted with the activated carbon at a temperature of not more than 200° C.

* * * * *